(12) United States Patent
Lu (10) Patent No.: US 7,080,389 B2
(45) Date of Patent: Jul. 18, 2006

(54) DISK DRIVE HAVING PROTRUSION AND RESILIENT STRUCTURES TO ENHANCE DISENGAGEMENT OF A SPINDLE MOTOR FROM A CLAMP

(75) Inventor: Ming-Hsing Lu, Taipei (TW)

(73) Assignee: Lite-On It Corp., Taipei (TW)

( * ) Notice: Subject to any disclaimer, the term of this patent is extended or adjusted under 35 U.S.C. 154(b) by 0 days.

(21) Appl. No.: 11/212,741

(22) Filed: Aug. 29, 2005

(65) Prior Publication Data

US 2006/0048169 A1    Mar. 2, 2006

(30) Foreign Application Priority Data

Aug. 31, 2004  (TW)  .............................. 93126252 A (51) Int. Cl.
 *G11B 17/03*  (2006.01)
(52) U.S. Cl. ...................................... 720/604
(58) Field of Classification Search ................ 720/604, 720/648, 601; 369/270.1, 271.1, 264, 75.11, 369/75.21, 77.11, 77.21, 75.1, 75.2, 77.1, 369/77.2
See application file for complete search history.

(56) References Cited

U.S. PATENT DOCUMENTS

| 6,643,252 B1 * | 11/2003 | Sogawa et al. ............. 720/604 |
| 6,813,772 B1 * | 11/2004 | Ariyoshi ..................... 720/600 |
| 6,928,045 B1 * | 8/2005 | Eum et al. ............... 369/270.1 |

* cited by examiner

*Primary Examiner*—William Kilmowicz
*Assistant Examiner*—Linh Nguyen
(74) *Attorney, Agent, or Firm*—Birch, Stewart, Kolasch & Birch, LLP (57) ABSTRACT

A disk drive includes a disk tray disposed within a casing for receiving an optical disk thereon, a clamp-holding seat disposed above the disk tray and having a clamp opening, a clamp disposed within the clamp opening in the clamp-holding seat and projecting downwardly from the bottom side thereof, a protrusion structure disposed on the clamp-holding seat, a resilient structure disposed on the clamp-holding seat opening opposite to the protrusion structure, and a spindle motor disposed below the disk tray for rotating the disk once the spindle motor is moved upward via the reading opening to a reading position, where the disk is sandwiched between the clamp and the spindle motor.

5 Claims, 8 Drawing Sheets

DISK DRIVE HAVING PROTRUSION AND RESILIENT STRUCTURES TO ENHANCE DISENGAGEMENT OF A SPINDLE MOTOR FROM A CLAMP

FIELD OF THE INVENTION

The present invention relates to an optical disk drive, more particularly to a disk drive having protrusion and resilient structures mounted between a clamp and a clamp-holding seat in order to enhance disengagement of a spindle motor from the clamp after the reading operation of an inserted disk.

BACKGROUND OF THE INVENTION

The optical disks are becoming more and more important for backing up data and exchanging information because the optical disks have many advantages including a high storage capacity, easy to handle and carry, and a long preserving time for the stored data. Thus, among all the data storage solutions, the optical disk drives can be found all around us such as in desktop computers, laptop computers, DVD players, and even some instruments or electronic products.

Figure 1A:
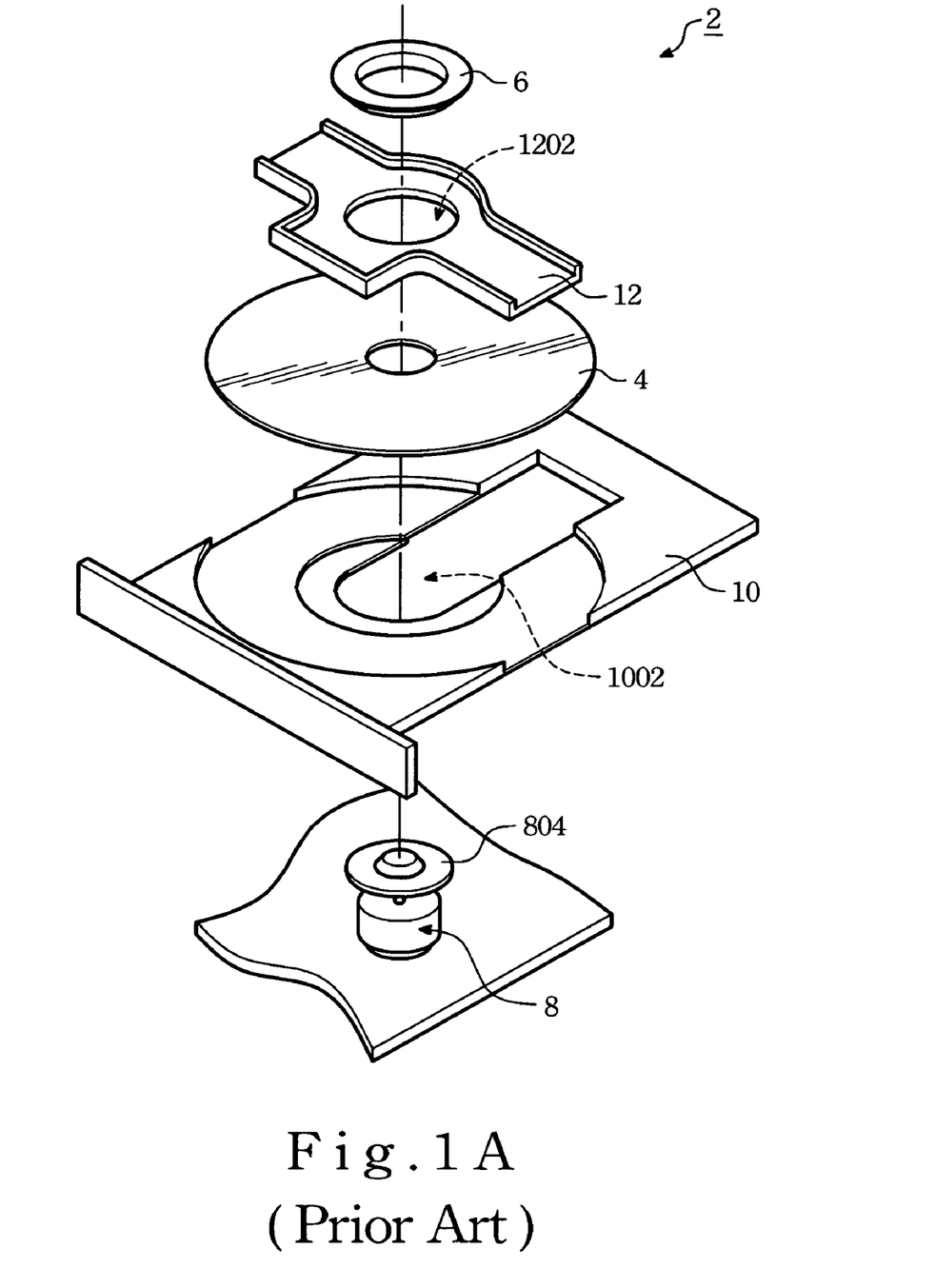
FIG. 1A is an exploded and perspective view of a conventional disk drive with an outer casing removed therefrom.
Figure 1B:
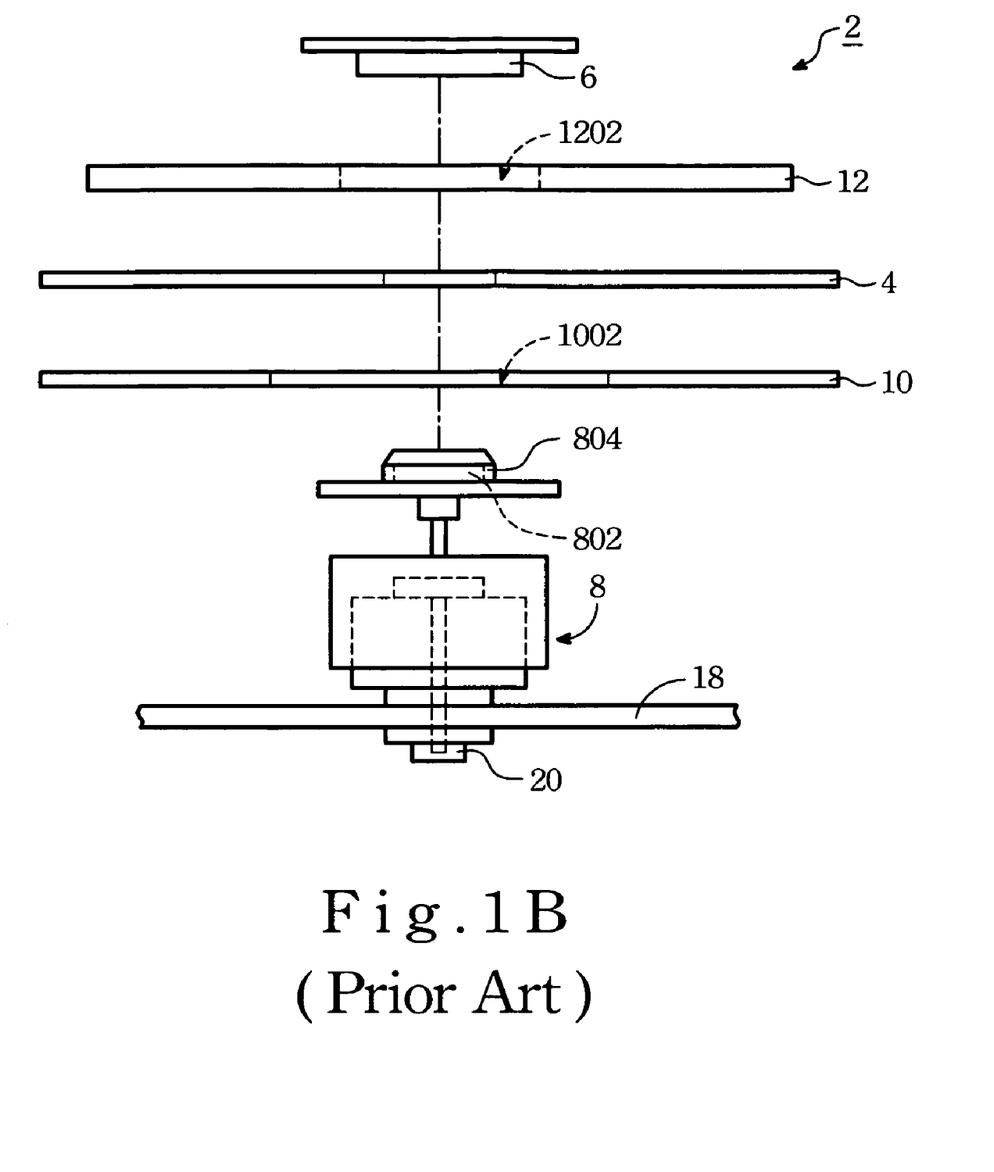
FIG. 1B is a front side view of the conventional disk drive with the outer casing removed therefrom.

Referring to FIGS. 1A and 1B, perspective and exploded views of a conventional disk drive 2 are shown to include an outer casing (not visible since removed), a disk tray 10 disposed within the casing for receiving an optical disk 4 thereon and having a reading opening 1002 formed therethrough, a clamp-holding seat 12 disposed above the disk tray 10 and having a clamp opening 1202, a clamp 6 disposed within the clamp opening 1202 in the clamp-holding seat 12 and projecting downwardly from a bottom side of the clamp-holding seat 12, and a spindle motor 8 disposed below the disk tray 10.

Figure 2A:
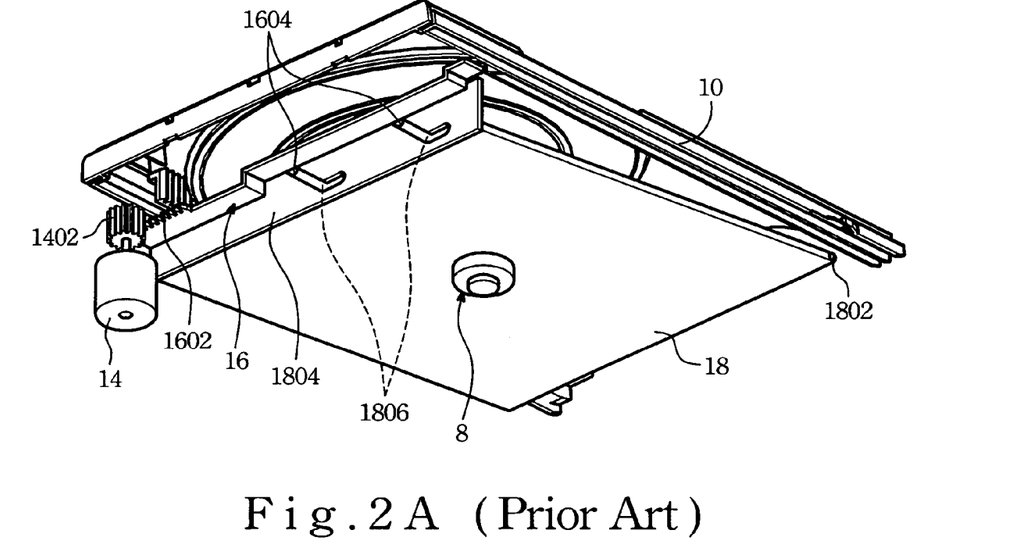
FIG. 2A is a bottom perspective view, illustrating a spindle-carrier frame and a driving motor of the conventional disk drive with the outer casing removed therefrom.
Figure 2B:
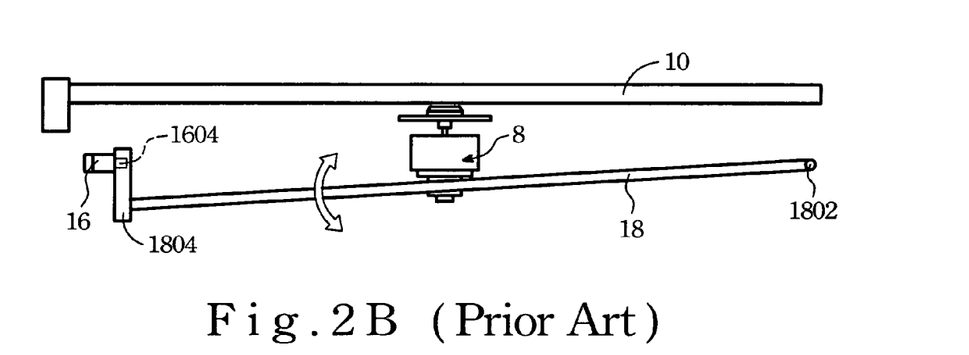
FIG. 2B is a side perspective view, illustrating how the spindle-carrier frame is lifted and lowered between reading and non-reading positions in the conventional disk drive.

Referring to FIGS. 2A and 2B, perspective and side views of the conventional disk drive 2 are shown and the latter includes a gear system 1402, a driving motor 14 for driving the disk tray 10 via the gear system (1402+1602) between an extended position, in which, the disk tray 10 extends outwardly from the casing (not shown) and a retracted position, in which, the disk tray 10 retracts inwardly into the casing (not shown). The conventional disk drive further includes a spindle-carrier frame 18 that is disposed below the disk tray 10 for carrying the spindle motor 8 thereon and that has an inner end portion 1802 pivoted to the casing and an outer end portion 1804 formed with left and right inclined guiding slots 1806, and a lifting plate 16 that is disposed within the casing adjacent to the spindle-carrier frame 18, that extends in a transverse direction relative to a longitudinal axis of the casing, and that has left and right couplers 1604 engaging slidably the slot-confining walls of the guiding slots 1806 in the spindle-carrier frame 18. The lifting plate 16 is operably connected to the driving motor 14 via the gear system (1402+1602) and is movable along the transverse direction to left and right sides of the casing upon rotation of the driving motor 14 such that rotation of the latter in the clockwise direction results in movement of the lifting plate 16 to one of the left and right sides of the casing, which, in turn, lifts the spindle-carrier frame 18 via the reading opening 1002 in the disk tray 10 to an upper position (i.e. reading position), where the spindle motor 8 cooperates with the clamp 6 to sandwich the disk 4 therebetween, and that rotation of the driving motor 14 in the anti-clockwise direction results in movement of the lifting plate 16 to the other one of the left and right sides of the casing, which, in turn, lowers the spindle-carrier motor 8 to a lower position (non-reading position).

Figure 3:
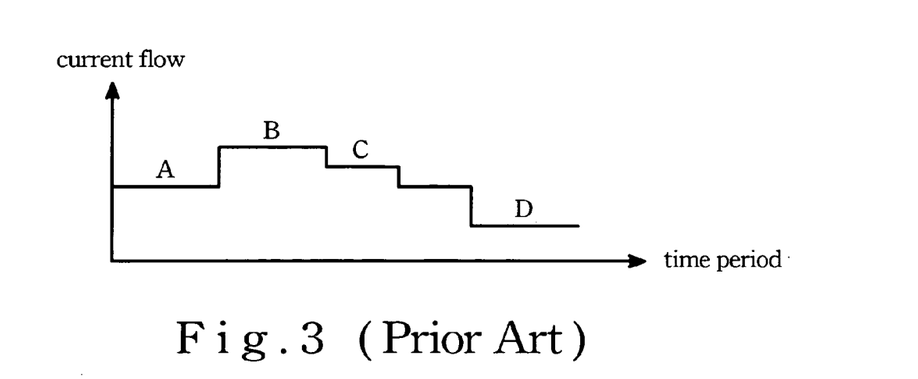
FIG. 3 illustrates the current flow with respect to a time period during disengagement of a spindle-motor from a clamp in the conventional optical disk drive.

Referring to FIGS. 1 and 3, the spindle motor 8 is mounted on the spindle-carrier frame 18 via a bearing unit 20 (see FIG. 1B) for rotating the disk 4 when the spindle-carrier frame 18 is disposed at the reading position. The spindle motor 8 has a top covering 804 provided with a magnetic element 802 that attracts the clamp 6 so as to sandwich the disk 4 between the clamp 6 and the top covering when the spindle-carrier frame 18 is disposed at the reading position. However, during movement of the spindle-carrier frame 18 to the lower position, the spindle motor 8 generally collides against the bearing unit 20 due to a sudden release of the spindle motor 8 from the clamp 6, thereby producing an undesired noise and consequently shortening the service life of the conventional disk drive 2.

FIG. 3 represents the current flow with respect to a time period during disengagement of the spindle motor 8 from the clamp 6. Note that to disengage the spindle motor 8 from the clamp 6, an electrical current of amount B is supplied to the driving motor 14 to overcome the magnetic attraction between the clamp 6 and the magnetic element 804. In order to ensure proper disengagement of the top covering 804 from the clamp 6, the electrical current B should be greater than an initial current A. After the lowering operation of the spindle-carrier frame 18 to the lower position, the electrical current B is gradually reduced to C and D respectively, wherein the electrical current D is the amount for driving the disk tray 10 to the retracted position. Generally D is smaller than A.

SUMMARY OF THE INVENTION

The object of the present invention is to provide an optical disk drive having protrusion and resilient structures mounted between a clamp and a clamp-holding seat of a disk drive in order to facilitate disengagement of a spindle motor from the clamp after the reading operation of an inserted disk.

A disk drive of the present invention includes: a casing, a disk tray disposed within the casing for receiving an optical disk thereon and having a reading opening formed therethrough, a clamp-holding seat disposed above the disk tray and having a bottom side formed with a clamp opening, a clamp disposed within the clamp opening in the clamp-holding seat and projecting downwardly from the bottom side thereof, a protrusion structure disposed between and mounted on one of the clamp-holding seat and the clamp in such a manner that the protrusion structure is disposed at a first side of the clamp opening, a resilient structure disposed between and mounted on the other one of the clamp-holding seat and the clamp in such a manner that the resilient structure is disposed at a second side of the clamp opening opposite to the first side, and a spindle motor disposed below the disk tray for rotating the disk once the spindle motor is moved upward via the reading opening so as to move the disk to a reading position, where the disk is sandwiched between the clamp and the spindle motor.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENTS

Figure 4A:
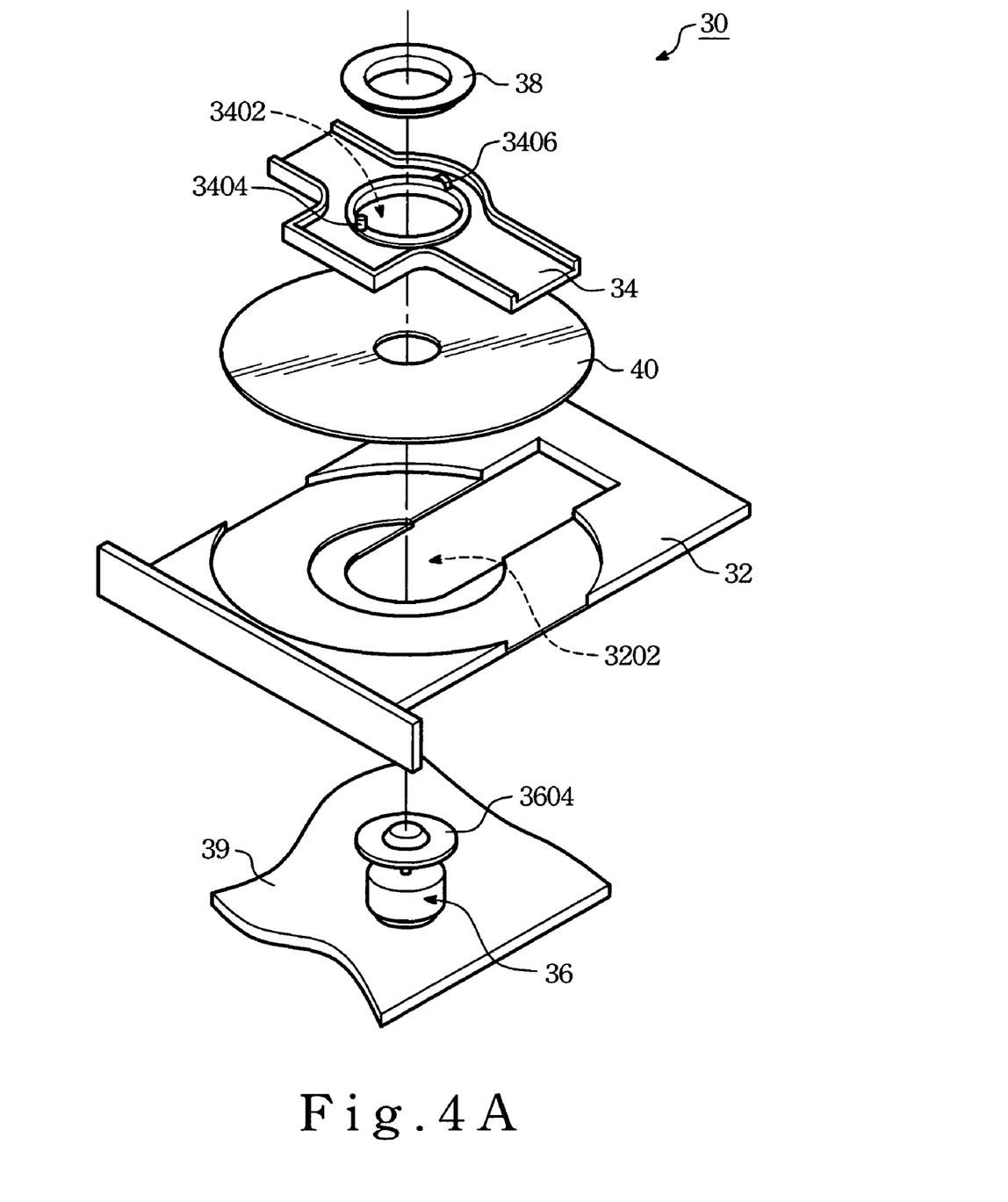
FIG. 4A is an exploded and perspective view of a first embodiment of a disk drive according to the present invention with an outer casing removed therefrom.
Figure 4B:
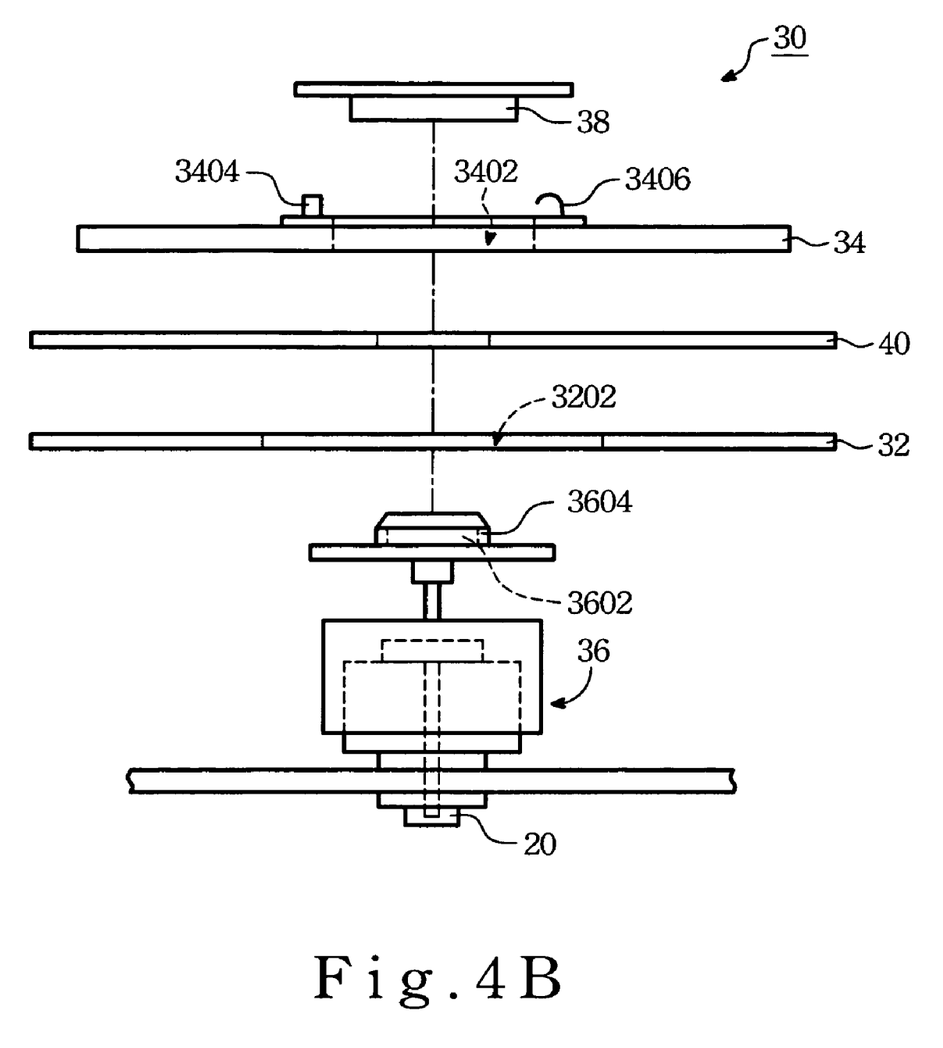
FIG. 4B is a front side view of the a first embodiment of the disk drive according to the present invention with the outer casing removed therefrom.
Figure 9:
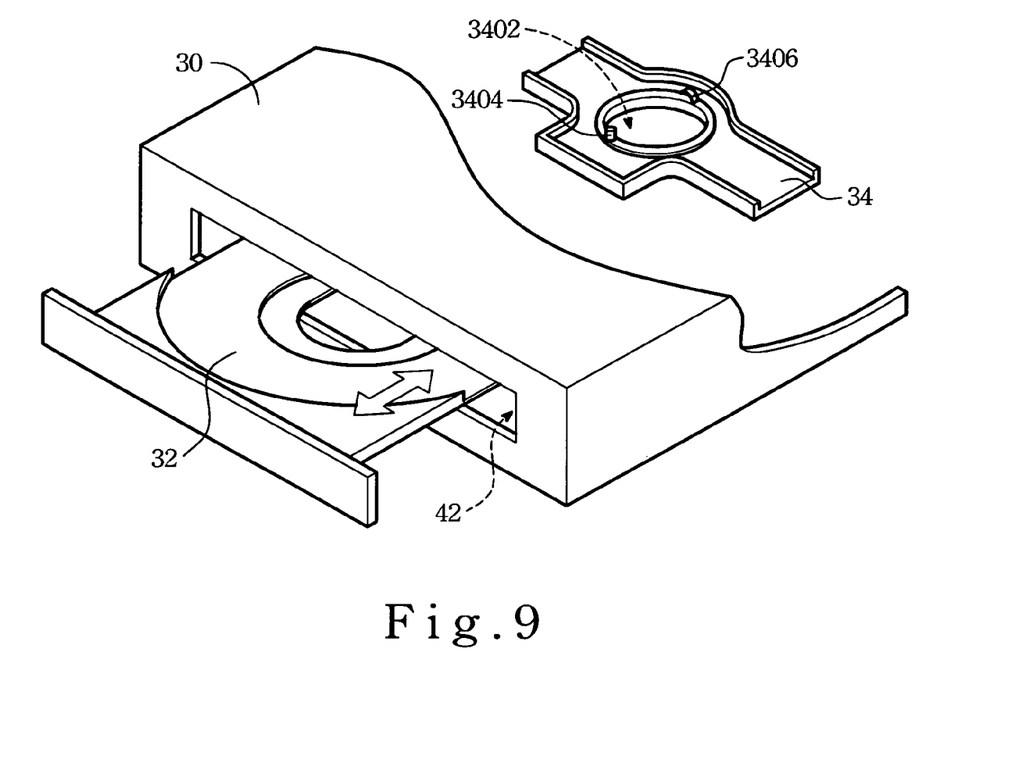
FIG. 9 is a perspective fragmentary view of the disk drive according to the present invention.

Referring to FIGS. 4A, 4B and 9, the first embodiment of an optical disk drive according to the present invention is shown to include a casing 30, a disk tray 32, a clamp-holding seat 34, a clamp 38, a protrusion structure 3404, a resilient structure 3402, a spindle-carrier frame 39 and a spindle motor 36.

As illustrated, the casing 30 is formed with an entrance-and-ejection slot 42, and defines a longitudinal axis. The disk tray 32 is disposed within the casing for receiving an optical disk 40 thereon, and has a reading opening 3202 formed therethrough. The clamp-holding seat 34 is disposed above the disk tray 32, and is formed with a clamp opening 3402 through bottom and top sides thereof. The clamp 38 is made from conductive materials, and has a cylindrical portion extending through the clamp opening 3402 in the clamp-holding seat 34 to expose the same from the bottom side of the clamp-holding seat 34, and an annular flange extending radially and outwardly from the cylindrical portion. The protrusion structure 3404 is mounted on the top side of the clamp-holding seat 34 at a first side of the clamp opening 3202. The resilient structure 3402 is mounted on the top side of the clamp-holding seat 34 at a second side of the clamp opening 3202 opposite to the first side. Under this condition, the protrusion structure 3404 is disposed proximate to the entrance-and-ejection slot 42 in the casing 30 while the resilient structure 3406 is disposed distal to the entrance-and-ejection slot 42 in the casing 30 (see FIG. 9).

The spindle-carrier frame 39 (see FIG. 4A) is disposed below the disk tray 32 for carrying the spindle motor 36 thereon in such a manner that the spindle motor 36 can rotate the disk 40 once the spindle-carrier frame 39 is moved upward via the reading opening 3202 to a reading position, where the disk is sandwiched between the clamp 38 and the top covering 3604 the spindle motor 36 by virtue of the magnetic element 3602. Since the structure and how the spindle-carrier frame 39 is moved between the upper and lower positions so as to conduct reading operation of the disk (at the upper position) is known in the art and is not the relevant feature of the present invention, a detailed description thereof is omitted herein for the sake of brevity.

Figure 5:
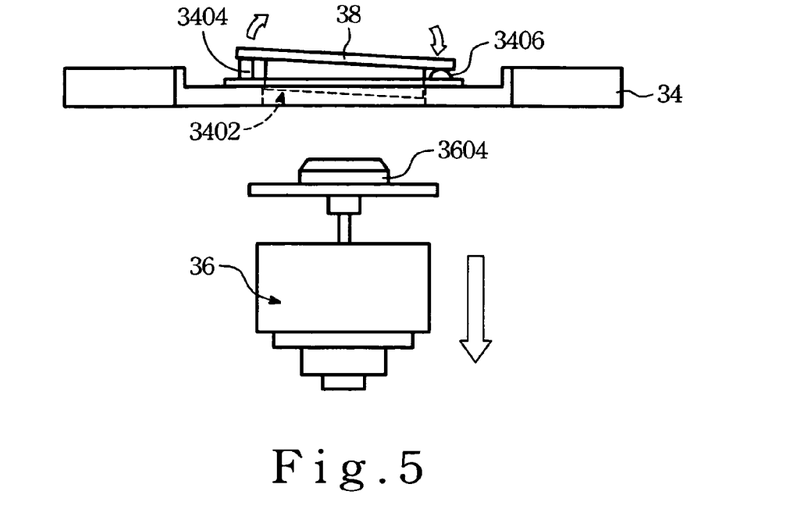
FIG. 5 illustrates how a clamp acts with respect to a clamp-holding seat during movement of a spindle motor to a lower position in the first embodiment of the disk drive according to the present invention.

Referring to FIG. 5, during the disengagement of the top covering 3604 from the clamp 38, even though the clamp 38 applies the similar pressure on the protrusion and resilient structures 3404, 3406, the resilient structure 3406 deforms firstly due to lesser rigidity when compared to the protrusion structure 3404 so as to cause tilting of one end of the clamp 38 downside, thereby resulting in removal of a fraction of the attraction force occurring between the clamp 36 and the top covering 3604 of the spindle motor 36, thereby reducing the impact of the spindle motor 36 against the bearing unit 20. Thus, little noise will be generated during the collision and the service life of the disk drive according to the present invention is prolonged.

Figure 7:
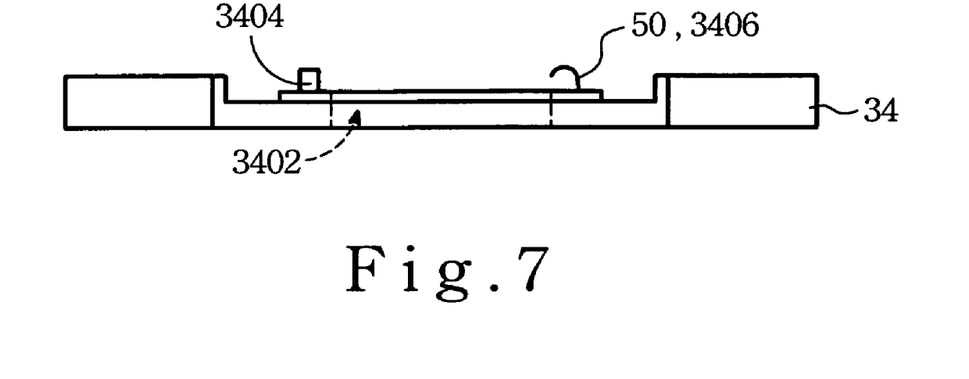
FIG. 7 is a front side view of the clamp-holding seat employed in the disk drive of the present invention.

Referring to FIG. 7, the resilient structure 3406 can be a leaf spring 50. However, it should not be limited thereto and can be made from any elastomeric materials so long it can restore to its initial shape once the applied pressure is removed. The protrusion structure 3404 can be made from any material so long as it's initial shape does not change due to compression.

Figure 8:
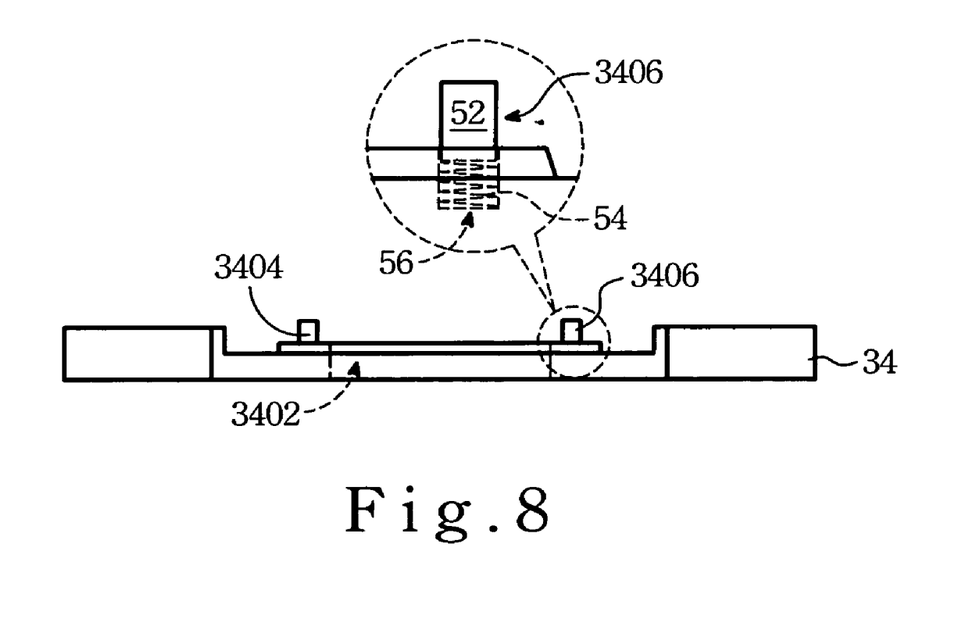
FIG. 8 is a front side view of a modified clamp-holding seat employed in the disk drive of the present invention.

Referring to FIG. 8, the resilient structure 3406 may include a compressible portion 54 such as a coil spring embedded within a groove 56 formed in the clamp-holding seat 34, and a non-compressible portion 52 such as a solid stem mounted on the compressible portion so that the whole assembly deforms when pressure is applied thereon.

Figure 6:
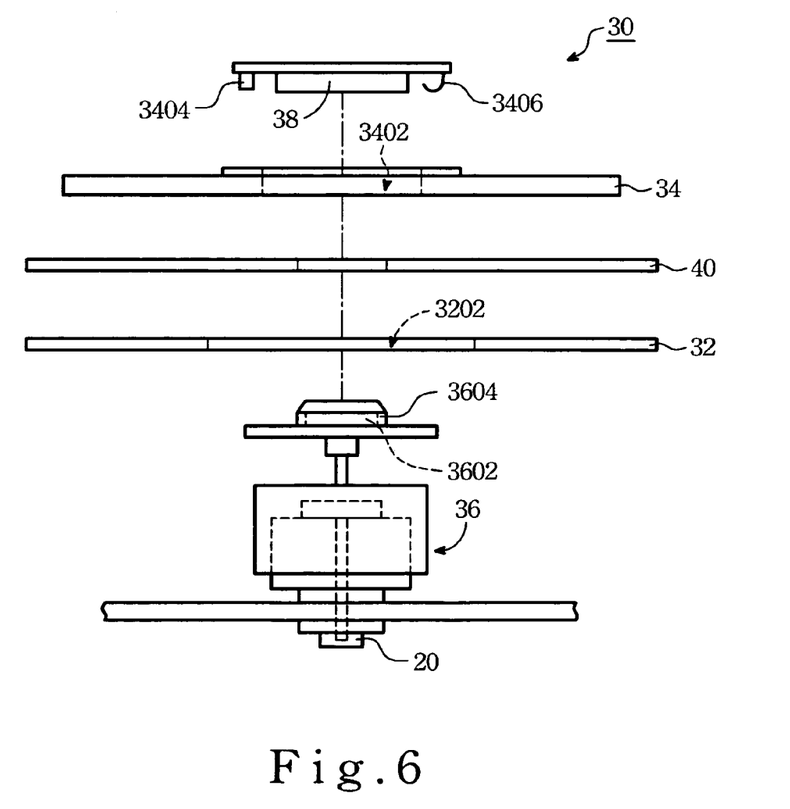
FIG. 6 is a front side view of the a second embodiment of the disk drive according to the present invention with the outer casing removed therefrom.

Referring to FIG. 6, the second embodiment of an optical disk drive according to the present invention is shown to have the construction similar to the previous embodiment. The only difference resides in that the protrusion and resilient structures 3404, 3406 are mounted on the annular flange of the clamp 38.

Figure 10:
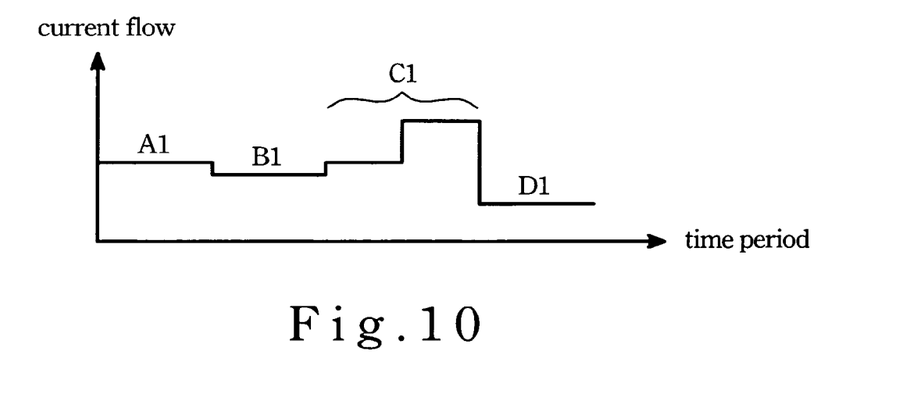
FIG. 10 illustrates the current flow with respect to a time period during disengagement of a spindle-motor from a clamp in the disk drive according to the present invention.

FIG. 10 illustrates the current flow with respect to a time period during disengagement of the top covering 3604 from the clamp 38 in the disk drive according to the present invention, wherein A1 denotes the initial current. For disengaging the top covering 3604 from the clamp 38, a current amount of B1<A1 is supplied to the driving motor and is increased gradually to the amount of C1 and is later reduced to the amount of D1, wherein D1 is the current amount for driving the disk tray between the extended and retracted positions. It is noted that the top covering 3604 is disengaged fully from the clamp 38 prior to reaching the maximum current C1 due to presence of and by virtue of the resilient structure 3406 since the latter enables the top covering 3604 to disengage from the clamp in two successive steps such little impact is resulted when the spindle motor collides against the bearing unit in the disk drive of the present invention.

Summarizing the abovementioned paragraphs, only a smaller amount of electrical current is supplied to the driving motor during the disengagement of the top covering from the clamp, thereby saving a considerable amount of electrical power in the long run. When the spindle motor collides against the bearing unit, only a small impact is generated since the spindle motor disengages from the clamp in two successive steps, thereby prolonging the service life of the bearing unit. Hence the disk drive of the present invention is consequently prolonged.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A disk drive comprising:
   a casing formed with an entrance-and-ejection slot and defining a longitudinal axis;
   a disk tray disposed within said casing for receiving an optical disk thereon, and having a reading opening;
   a clamp-holding seat disposed above said disk tray, and having a bottom side formed with a clamp opening;
   a clamp disposed within said clamp opening in said clamp-holding seat and projecting downwardly from said bottom side thereof;
   a protrusion structure disposed between and mounted on one of said clamp-holding seat and said clamp in such a manner that said protrusion structure is disposed at a first side of said clamp opening;
   a resilient structure disposed between and mounted on the other one of said clamp-holding seat and said clamp in such a manner that said resilient structure is disposed at a second side of said clamp opening opposite to said first side; and
   a spindle motor disposed below said disk tray for rotating the disk once said spindle motor is moved upward via said reading opening so as to move the disk to a reading position, where the disk is sandwiched between said clamp and said spindle motor.

2. The disk drive according to claim 1, wherein said clamp-holding seat has a top side opposite said bottom side, said clamp opening being formed through said bottom and top sides of said clamp-holding seat, said protrusion and resilient structures being mounted on said top side of said clamp-holding seat at said first and second sides of said clamp opening.

3. The disk drive according to claim 2, wherein said clamp has a cylindrical portion extending through said clamp opening in said clamp-holding seat to expose said cylindrical portion from said bottom side of said clamp-holding seat and an annular flange extending radially and outwardly from said cylindrical portion, said protrusion structure being mounted on said annular flange of said clamp proximate to said entrance-and-ejection slot in said casing, said resilient structure being mounted on said annular flange of said clamp distal from said entrance-and-ejection slot in said casing.

4. The disk drive according to claim 1, wherein said protrusion and resilient structures are proximate to said entrance-and-ejection slot in said casing.

5. The disk drive according to claim 4, further comprising:
   a driving motor for driving said disk tray between an extended position, in which, the disk tray extends outwardly from the casing via said entrance-and-ejection slot, and a retracted position, in which, the disk tray retracts inwardly into the casing via said entrance-and-ejection slot;
   a spindle-carrier frame disposed below said disk tray or carrying said spindle motor thereon and having an inclined guiding slot defined by a slot-confining wall;
   a gear system; and
   a lifting plate extending in a transverse direction with respect to said longitudinal axis and connected operably to said driving motor via said gear system so as to be movable along said transverse direction to left and right sides of casing, said lifting plate having a coupler slidably engaging said slot-confining wall of said guiding slot in said spindle-carrier frame in such a manner that movement of said lifting plate along said transverse direction to one of said left and right sides of said casing results in lifting of said spindle-carrier frame to an upper position defining said reading position and movement of said lifting plate in the other one of said left and right sides of said casing results in lowering of said spindle-carrier frame to a lower position below said upper position.

* * * * *